Patented Aug. 11, 1953

2,648,668

UNITED STATES PATENT OFFICE 2,648,668

PROCESS FOR RECOVERING NICOTINIC ACID FROM SOLUTIONS THEREOF IN SULFURIC ACID

Andrew J. Martin, East Orange, N. J., assignor to Allied Chemical & Dye Corporation, New York, N. Y., a corporation of New York No Drawing. Application April 26, 1951, Serial No. 223,153

17 Claims. (Cl. 260—295.5)

This invention relates to a process for recovering nicotinic acid from solutions thereof in substantially water-free sulfuric acid, and more particularly to the recovery of nicotinic acid in the form of nicotinic acid bisulfate from sulfuric acid-containing oxidation masses in which the nicotinic acid is produced.

Nicotinic acid may advantageously be produced by the oxidation, in a sulfuric acid-containing oxidizing medium, of N-heteroaryl compounds containing a single pyridine nucleus and having an oxidizable organic hydrocarbon grouping attached to the pyridine nucleus in a single beta position and not more than two additional oxidizable hydrocarbon substituents attached to the pyridine ring, each of which is in an alpha position, for example, quinoline, beta picoline, 5- and 8-hydroxy quinolines, 5- and 8-nitroquinolines, 2,3-lutidine and the like, either with sulfuric acid alone or with nitric acid or other oxidizing agents in a sulfuric acid reaction medium, or with a mixed sulfuric acid-nitric acid oxidizing agent in a substantially anhydrous medium, in each case using an excess of sulfuric acid over that required to oxidize the N-heteroaryl compound to nicotinic acid.

The product obtained from such oxidations is a mixture of nicotinic acid with the excess sulfuric acid over that used and lost in the oxidation process, so that to recover the nicotinic acid in pure form it is necessary to separate it from the sulfuric acid. If nitric acid is used in the oxidizing medium, it is usually substantially completely eliminated during the oxidation process, either directly in oxidizing the N-heteroaryl compound or by decomposition to nitrogen oxides, so that very little, if any, nitric acid remains in the oxidation mass after completion of the oxidation reaction; consequently the recovery process in this case also is essentially a recovery from concentrated sulfuric acid solutions. Such oxidation masses usually contain between about 10% and about 30% of nicotinic acid and between about 90% and about 70% of sulfuric acid.

Recovery of nicotinic acid from concentrated sulfuric acid solutions has been carried out in the past by a number of methods; according to one prior art method, by drowning the oxidation mass in a large excess of water, for example quantities of the order of about 2 to about 3 volumes of water per volume of reaction mass, adding copper oxide or a copper salt to the resulting mass, neutralizing the mass to precipitate copper nicotinate, recovering the precipitated copper nicotinate as by filtration, decomposing the copper nicotinate with alkali to form sodium nicotinate, dissolving the sodium nicotinate in water, neutralizing the sodium nicotinate solution to the iso-electric point of nicotinic acid, cooling to crystallize the nicotinic acid and recovering the crystallized nicotinic acid. This process, while satisfactory in many respects, results in the formation of large quantities of dilute solutions of ammonium or alkali metal sulfates from the drowning and neutralization of the oxidation mass, which presents a severe loss of sulfuric acid as well as a serious waste disposal problem if the dilute solution is discarded as it usually is in practice, since recovery of the sulfates themselves or of sulfuric acid values from such solutions is not economically practical.

A primary object of the present invention is to provide a process for recovering nicotinic acid and sulfuric acid from mixtures thereof.

It is another object of the invention to provide such a recovery process wherein little or no acidic waste products are produced.

A further object of the present invention is to provide a process for recovering nicotinic acid from mixtures thereof with concentrated sulfuric acid in which the waste disposal problem is minimized or avoided.

A still further object of the invention is to provide a process in which the necessity for aqueous dilution of sulfuric acid is avoided.

These and other objects are accomplished according to my invention wherein solutions of nicotinic acid in substantially water-free sulfuric acid are mixed with sufficient quantities of a normally liquid aliphatic acid having at least 2 carbon atoms to bring about precipitation of nicotinic acid bisulfate from solution.

In carrying out the process according to my invention, a solution of nicotinic acid in substantially water-free sulfuric acid, such as a nicotinic acid oxidation mass as described, is mixed with a quantity of the normally liquid aliphatic acid at least sufficient to bring about precipitation of nicotinic acid bisulfate from solution at the desired temperature, with or without the aid of seeding or other mechanical treatment of the mass as required, and preferably sufficient to render such precipitated material readily separable from the remaining liquid mass. The mass is preferably allowed to stand for a period sufficient to permit substantially complete precipitation of the nicotinic acid bisulfate from solution.

The precipitated nicotinic acid bisulfate is then separated from the mother liquor by suitable means, for example by filtration or centrifugation, and converted to nicotinic acid by known means.

The mother liquor remaining after removal of the nicotinic acid bisulfate from the acid-treated oxidation mass, consisting essentially of sulfuric acid and aliphatic acid, may be treated to recover both the aliphatic acid and substantially undiluted sulfuric acid, both of which may be reused in the process, by addition to the mother liquor of a relatively small quantity of water, for example between about 2% and about 5% by volume based on the volume of the mother liquor. I have discovered, surprisingly, that while the anhydrous mixture of sulfuric acid and aliphatic acid is substantially homogeneous, nevertheless, when a small quantity of water is present, the components separate into two liquid layers, an upper aliphatic acid layer and a lower sulfuric acid layer. The layers may be separated, as by decantation, the sulfuric acid used in subsequent nicotinic acid oxidations, the aliphatic acid may be reused without further purification in a subsequent nicotinic acid bisulfate precipitation step with only slight, if any, reduction in yield of nicotinic acid bisulfate recovered.

Any normally liquid aliphatic acid having 2 or more carbon atoms is suitable for use in the process of my invention, for example such lower aliphatic acids as acetic, propionic, butyric, valeric, caproic, caprylic etc. Formic acid is unsuitable as it is readily decomposed by sulfuric acid.

The quantity of aliphatic acid used is not critical but should preferably be sufficient to precipitate and to facilitate recovery of the precipitated nicotinic acid bisulfate. While the use of a volume of aliphatic acid equal to the volume of nicotinic acid-sulfuric acid solution will result in precipitation of nicotinic acid bisulfate, the resulting mass is thick and pasty and difficult to resolve cleanly into liquid and solid components. Accordingly I prefer to use at least about two volumes of aliphatic acid per volume of nicotinic acid-sulfuric acid solution, usually between about 2 volumes and about 10 volumes being desirable.

The aliphatic acid and the nicotinic acid-sulfuric acid solutions may be mixed in any desired manner either by adding the aliphatic acid to the nicotinic acid solution or vice versa, preferably while agitating to promote thorough mixing. Temperature is more readily controlled however if the sulfuric acid solution is added to the aliphatic acid. Such mixing usually results in a temperature rise of the mixture, for example from room temperature (about 25° C.) to about 30°–50° C. depending upon the volume and character of aliphatic acid used. Precipitation of nicotinic acid bisulfate from the mixture is facilitated by cooling the mass to room temperature or somewhat below, and in some cases it may be necessary or desirable to initiate crystallization by mechanical treatment such as "seeding," for example by the addition of crystals of nicotinic acid bisulfate to the mass or by agitation or by scraping or rubbing the inside wall of the container.

The precipitated nicotinic acid bisulfate may be separated from the mother liquor by any suitable means, as by filtration, centrifugation or the like and washed if desired, for example with aliphatic acid.

Nicotinic acid may be recovered from the separated nicotinic acid bisulfate by any suitable means, for example by slurrying the nicotinic acid bisulfate in a lower aliphatic alcohol such as n-butanol, adding sufficient ammonia to combine with the sulfuric acid of the nicotinic acid bisulfate, forming alcohol-insoluble ammonium sulfate and releasing the nicotinic acid which dissolves in the alcohol, whereupon the two phases may be separated as by filtration, and the nicotinic acid recovered from the alcohol by crystallization as described in my copending application Serial No. 222,543, filed April 24, 1951.

The mother liquor may be resolved readily and substantially completely into its two components, aliphatic acid and sulfuric acid, by the addition thereto of relatively very small quantities of water. The exact quantity of water necessary will vary somewhat depending on the particular aliphatic acid used and upon the relative proportions of aliphatic and sulfuric acids in the mother liquor. In general a quantity of water between about .02 part and about .05 part by volume based on the volume of the mother liquor is sufficient to cause stratification of the mixture into an essentially aliphatic acid layer and an essentially sulfuric acid layer.

The resulting aliphatic acid may be reused without further treatment to precipitate a fresh batch of nicotinic acid bisulfate and the sulfuric acid may be recycled for use in the oxidation either with no fortification or with simple fortification with $SO_3$ or oleum.

The following specific examples will further illustrate my invention:

EXAMPLE I

ACETIC ACID

In six separate runs, 25 parts by volume of a nicotinic acid oxidation mass having a specific gravity of 1.746 (and thus being equivalent to 43.65 parts by weight) and containing 20% by weight of nicotinic acid and 80% by weight of sulfuric acid (i. e. 15.7 parts by weight of nicotinic acid bisulfate in each charge) were mixed while agitating with 50, 75, 100, 125, 150 and 250 parts by volume respectively, of glacial acetic acid, i. e. in volume ratios of acetic acid to oxidation mass of 2, 3, 4, 5, 6 and 10 respectively. During mixing, the temperatures of the mixtures rose somewhat from room temperature (about 25° C.) to about 45°–50° C. The mixtures were then cooled to about 15° C., and upon scratching or rubbing the inside wall of the mixing vessel crystals of nicotinic acid bisulfate began to form. The mixtures were allowed to stand for the lengths of time indicated in Table I below, whereupon nicotinic acid bisulfate was recovered in the quantities and yields indicated in Table I which summarizes the data and results of the six runs.

*Table I*

ACETIC ACID RUNS

| Run No. | Vol. Ratio, Acid: Oxidation Mass | Parts by volume | | Standing Time, Hours | Yield | |
|---|---|---|---|---|---|---|
| | | Aliph. Acid | Oxidation Mass | | Parts by Wt. NABS | Weight Percent |
| 1 | 2 | 50 | 25 | 1 | 9.4 | 59.8 |
| 2 | 3 | 75 | 25 | 1 | 9.8 | 62.4 |
| 3 | 4 | 100 | 25 | 1 | 9.7 | 61.8 |
| 4 | 5 | 125 | 25 | 1 | 9.2 | 58.7 |
| 5 | 6 | 150 | 25 | 16 | 10.2 | 65 |
| 6 | 10 | 250 | 25 | 16 | 10.4 | 66.3 |

EXAMPLE II

Propionic Acid

In eight separate runs, propionic acid and a nicotinic acid oxidation mass of the same characteristics as that described in Example I were mixed while agitating, in volume ratios of acid to oxidation mass of 1, 2, 3, 4, 5, 6, 7 and 10 respectively. The mixtures were cooled to about 15° C., and upon scraping the inside wall of the containers the cooled mixtures began to crystallize. They were then allowed to stand at this temperature for the lengths of time indicated in Table II below when the nicotinic acid bisulfate crystals were recovered in the quantities and yields indicated in Table II which summarizes the data and results of the six runs.

Table II
PROPIONIC ACID RUNS

| Run No. | Vol. Ratio, Acid:Oxidation Mass | Parts by Volume | | Standing Time, Hours | Yield | |
|---|---|---|---|---|---|---|
| | | Aliph. Acid | Oxidation Mass | | Parts by Wt. NABS | Weight Percent |
| 1 | 1 | 50 | 48 | 1 | 11 | 36.5 |
| 2 | 2 | 50 | 25 | 1 | 11.1 | 70.7 |
| 3 | 3 | 75 | 25 | 1 | 12.2 | 77.7 |
| 4 | 4 | 100 | 25 | 1 | 12.8 | 81.5 |
| 5 | 5 | 125 | 25 | 1 | 13.3 | 84.7 |
| 6 | 6 | 150 | 25 | 1 | 13.0 | 82.8 |
| 7 | 7 | 175 | 25 | 16 | 13.9 | 88.6 |
| 8 | 10 | 250 | 25 | 16 | 14.4 | 91.6 |

EXAMPLE III

Butyric Acid 25 volume parts of a nicotinic acid oxidation mass having a specific gravity of 1.746 (43.65 parts by weight) and containing 20% by weight of nicotinic acid and 80% by weight of sulfuric acid were mixed, while agitating, with 250 volume parts of butyric acid (a volume ratio of 1:10). The temperature rose during the mixing from room temperature (about 25° C.) to about 33° C. Two liquid layers formed. The mixture was then cooled to 20° C. The inside wall of the container was scratched whereupon crystals of nicotinic acid bisulfate began to form. The mixture was allowed to stand for 16 hours, when the crystals were filtered off and air dried to constant weight. The dried crystals of nicotinic acid bisulfate amounted to 14.7 parts by weight corresponding to a yield of 93.6%.

EXAMPLE IV

Butyric Acid

The process of Example III was repeated in a manner similar in all respects to that described therein. To the 274 parts by volume of the resulting filtrate were added 7 parts by volume of water (39:1 ratio) (2.5%). Two layers formed, a lower sulfuric acid layer of 34 volume parts, and an upper butyric acid layer of 240 volume parts.

The layers were separated by decantation and the upper layer was added to 25 parts by volume of a nicotinic acid oxidation mass of the same composition and characteristics as those described in the previous examples. On cooling to 20° C. two phases separated, an upper, oily layer which crystallized when the side of the container was rubbed. The mixture was allowed to stand overnight (16 hours) and the nicotinic acid bisulfate crystals were then filtered off and dried. The dried crystals amounted to 14.5 parts corresponding to a yield of 92.4%.

EXAMPLE V

Caprylic Acid 25 parts by volume of a nicotinic acid oxidation mass having the same composition as that described in Example I were poured, while agitating, into 250 parts by volume of 90% caprylic acid ($CH_3(CH_2)_6COOH$). The temperature rose from 26° C. to 30° C. and the mixture darkened. A black oil separated which partially crystallized on scratching the inside wall of the container. The mixture was allowed to stand overnight (16 hours). The crystals of nicotinic acid bisulfate were then filtered off and dried. They amounted to 11.9 parts by weight corresponding to a recovery of 75.8%.

While the above describes the preferred embodiments of my invention, it will be understood that departures may be made therefrom within the scope of the specification and claims.

I claim:

1. A process for recovering nicotinic acid bisulfate from solutions thereof in substantially water-free sulfuric acid, which comprises mixing the nicotinic acid-sulfuric acid solution with a normally liquid aliphatic acid having at least 2 carbon atoms and separating the nicotinic acid bisulfate which precipitates.

2. The process according to claim 1 wherein the normally liquid aliphatic acid is acetic acid.

3. The process according to claim 1 wherein the normally liquid aliphatic acid is propionic acid.

4. The process according to claim 1 wherein the normally liquid aliphatic acid is butyric acid.

5. The process according to claim 1 wherein the normally liquid aliphatic acid is caprylic acid.

6. A process for recovering nicotinic acid bisulfate from solutions thereof in substantially water-free sulfuric acid, which comprises mixing the nicotinic acid-sulfuric acid solution with at least about two parts by volume of a normally liquid aliphatic acid having at least 2 carbon atoms, per unit volume of solution, and separating the nicotinic acid bisulfate which precipitates.

7. The process according to claim 6 wherein the aliphatic acid is propionic acid.

8. The process according to claim 6 wherein the aliphatic acid is butyric acid.

9. A process for recovering nicotinic acid bisulfate from solutions thereof in substantially water-free sulfuric acid, which comprises mixing the nicotinic acid-sulfuric acid solution with between about 2 and about 10 parts by volume of a normally liquid aliphatic acid having at least 2 carbon atoms, per unit volume of solution, and separating the nicotinic acid bisulfate which precipitates.

10. The process according to claim 9 wherein the aliphatic acid is propionic acid.

11. The process according to claim 9 wherein the aliphatic acid is butyric acid.

12. A process for recovering nicotinic acid bisulfate from substantially water-free nicotinic acid-containing oxidation masses containing between about 10 parts and about 30 parts by weight of nicotinic acid and between about 70 parts and about 90 parts by weight of sulfuric acid, which comprises mixing the oxidation mass with at least about two parts by volume of a lower aliphatic acid having at least 2 carbon atoms, per unit volume of oxidation mass, cooling the resultant mixture to a temperature at least as low as about 25° C., mechanically treating said mixture to initiate crystallization, allowing said mixture to stand for a period sufficient to effect substantially complete crystallization of the nicotinic acid bisulfate, and separating the precipitated nicotinic acid bisulfate.

13. The process according to claim 12 wherein the lower aliphatic acid is acetic acid.

14. The process according to claim 12 wherein the lower aliphatic acid is propionic acid.

15. The process according to claim 12 wherein the lower aliphatic acid is butyric acid.

16. The process according to claim 12 wherein the lower aliphatic acid is caprylic acid.

17. A process for recovering nicotinic acid bisulfate and sulfuric acid from substantially water-free nicotinic acid-containing oxidation masses containing between about 10 parts and about 30 parts by weight of nicotinic acid and between about 70 parts and about 90 parts by weight of sulfuric acid, which comprises mixing the oxidation mass with at least about two parts by volume of a lower aliphatic acid having at least 2 carbon atoms, per unit volume of oxidation mass, cooling the resultant mixture to a temperature at least as low as about 25° C., mechanically treating said mixture to initiate crystallization, allowing said mixture to stand for a period sufficient to effect substantially complete crystallization of the nicotinic acid bisulfate, separating the solid nicotinic acid bisulfate from the liquid mother liquor, recovering the precipitated nicotinic acid bisulfate, adding to the mother liquor a quantity between about 2% and about 5% by volume based on the volume of the mother liquor of water, separating the liquid layers which form, separating sulfuric acid from the lower layer and lower aliphatic acid from the upper layer.

ANDREW J. MARTIN.

No references cited.